United States Patent
Bellato et al.

(10) Patent No.: US 8,594,058 B2
(45) Date of Patent: Nov. 26, 2013

(54) METHOD OF DYNAMICALLY ADJUSTING TRANSMISSION CAPACITY OF A DATA TRANSMISSION CONNECTION

(75) Inventors: Alberto Bellato, Bernareggio (Milan) (IT); Matteo Gumier, Sesto Calende (IT); Paolo Fogliata, Chiari (IT)

(73) Assignee: Alcatel Lucent, Paris (FR)

( * ) Notice: Subject to any disclaimer, the term of this patent is extended or adjusted under 35 U.S.C. 154(b) by 151 days.

(21) Appl. No.: 13/321,654

(22) PCT Filed: Jun. 18, 2010

(86) PCT No.: PCT/EP2010/058617
§ 371 (c)(1),
(2), (4) Date: Nov. 21, 2011

(87) PCT Pub. No.: WO2010/149581
PCT Pub. Date: Dec. 29, 2010

(65) Prior Publication Data
US 2012/0127966 A1    May 24, 2012

(30) Foreign Application Priority Data

Jun. 24, 2009   (EP) .................................... 09305595

(51) Int. Cl.
  *H04J 3/16*    (2006.01)
  *H04W 72/04*   (2009.01)
  *G06F 15/16*   (2006.01)

(52) U.S. Cl.
  USPC ............ 370/336; 370/393; 370/419; 709/232

(58) Field of Classification Search
  USPC ......... 370/221, 230, 258, 336, 393, 353–355, 370/419–487; 709/232; 714/2
  See application file for complete search history.

(56) References Cited

U.S. PATENT DOCUMENTS 6,700,900 B1 * 3/2004 Turban .......................... 370/465
7,616,558 B2 * 11/2009 Christensen et al. .......... 370/221
(Continued)

FOREIGN PATENT DOCUMENTS

WO    WO 01/73988    10/2001

OTHER PUBLICATIONS

Itu-T Draft Study Period 2005-2008; Link Capacity Adjustment Scheme (LCAS) for Virtual Concatenated Signals; G.7042/Y.1305 (Mar. 2006); International Telecommunication Union.

(Continued)

*Primary Examiner* — Afsar M Qureshi
(74) *Attorney, Agent, or Firm* — Carmen Patti Law Group, LLC (57) ABSTRACT

A method of dynamically adjusting a transmission capacity of a data transmission connection is proposed. The method comprises different steps at a network end node. An incoming frame-structured time division multiplex signal carrying incoming timeslots is received from a client. Furthermore, a request data set comprising for at least one incoming timeslot a corresponding subset is received. The subset has an identifier for identifying an existing data transmission connection and a status indicator for indicating to the network end node a status requested by the client for the corresponding timeslot. If the status indicator indicates a request for adding the timeslot to the data transmission connection or removing the timeslot from the data transmission connection, the network end node adjusts the transmission capacity of the data transmission connection. If the status indicator indicates valid data in the incoming timeslot, the network end node transmits the data of the incoming timeslot via the existing data transmission connection to a far-end network end node.

6 Claims, 8 Drawing Sheets

(56) References Cited

U.S. PATENT DOCUMENTS

| | | | |
|---|---|---|---|
| 7,684,426 B2* | 3/2010 | Narvaez et al. | 370/419 |
| 2005/0102412 A1* | 5/2005 | Hirsimaki | 709/232 |
| 2006/0018324 A1 | 1/2006 | Nisar et al. | |
| 2006/0140225 A1* | 6/2006 | Christensen et al. | 370/536 |
| 2010/0254709 A1* | 10/2010 | Narvaez et al. | 398/98 |
| 2012/0044800 A1* | 2/2012 | Coltro | 370/217 |

OTHER PUBLICATIONS

Geneva, Ch; No. G.7042/Y.1305 (Mar. 29, 2006; XP017404580.

Verchere et al; The Private User Network Interface-a GMPLS-compliant signaling interface for overlay-based multilayer networks; Journal of Optical Networking; XX, XX, vol. 3, No. 3, Mar. 1, 2004; pp. 119-132, XP002348545; DOI:10.1364/JON.3.000119 Optical Networking Journal.

\* cited by examiner

METHOD OF DYNAMICALLY ADJUSTING TRANSMISSION CAPACITY OF A DATA TRANSMISSION CONNECTION

FIELD OF THE INVENTION

The invention relates to a method of dynamically adjusting the transmission capacity of a data transmission.

BACKGROUND

A client may rely on the transmission technique of time division multiplexing (TDM) for transmitting data to a remote client via a transmission connection provided by a network. The client may wish to adjust the transmission capacity of the transmission connection.

In the case, that the data transmission is carried out via a virtual container (VC) transported via the transmission connection by the network from the client to the remote client, the client may increase the transmission capacity by using a further, second virtual container along this data transmission connection. In order to successfully do so, the client has to carry out two steps. The first step is that of sending to the network a request for being provided by the network with an additional virtual container for this data transmission connection. This first step is a request to the network for adjusting the transmission capacity. Once the client has been provided with the additional virtual container by the network, the virtual containers have to be used for data transmission along the same data transmission connection, which is known as virtual concatenation. In order to establish a virtual concatenation, the client has to carry out the second step of exchanging messages with the remote client according to the protocol known as Link Capacity Adjustment Scheme (LCAS) for negotiating with the second client about how and when to use the different virtual containers for data transmission via the data transmission connection. The LCAS protocol provides steps for ensuring a hitless adjustment of the capacity of a data transmission connection between the two clients in the case that a number of virtual containers have been provided by the network for a virtual concatenation. The LCAS protocol does not provide steps for issuing the first request for an additional transmission capacity.

Thus, the first client has to perform two different steps: the first step of sending a request message to the network as the request for an additional capacity in the form of an additional virtual container, and the second step of exchanging messages with the second client via the LCAS protocol for ensuring a hitless modification of the transmission capacity of the data transmission connection.

SUMMARY

It is an object of the invention to reduce the amount of message exchange performed by a client for successfully modifying a capacity of a data transmission connection and agreeing with a remote client upon the modified transmission capacity.

For this purpose, a new method of dynamically adjusting a transmission capacity of a data transmission connection is proposed. The method comprises different steps at a network end node. An incoming frame-structured time division multiplex signal (TDM) carrying incoming timeslots is received from a client. Furthermore, a request data set comprising for at least one incoming timeslot a corresponding subset is received. The subset has an identifier for identifying an existing data transmission connection and a status indicator for indicating to the network end node a status requested by the client for the corresponding timeslot.

If the status indicator indicates a request for adding the timeslot to the data transmission connection or removing the timeslot from the data transmission connection, the network end node adjusts the transmission capacity of the data transmission connection. If the status indicator indicates valid data in the incoming timeslot, the network end node transmits the data of the incoming timeslot via the existing data transmission connection to a far-end network end node.

Furthermore, the network end node transmits the request data subset to the far-end network end node for signalling the requested status to a remote client.

The request data received from the client combines two purposes of signalling. The first purpose is that of requesting from the network an adjusted capacity for a data transmission connection. This first purpose is complied with since the network automatically adjusts the capacity according to the request data. The second purpose is that of ensuring a hitless change of the transmission capacity by exchanging messages with the remote client. This second purpose is complied with since the request data subset as a request for adding a timeslot to or removing a timeslot from the data transmission connection is transmitted to the far-end network end node, to which the remote client is connected.

The amount of signalling, which has to be carried out between the client and the network end node for the two purposes, is only that of exchanging a request message subset for the corresponding timeslot.

Therefore, the proposed method of exchanging a request data subset between a client and a network end node is an advantageous solution for signalling two things at the same time: a request to a network for an adjustment of a transmission capacity and a request to a remote client for agreeing upon a hitless change of the transmission capacity.

BRIEF DESCRIPTION OF THE DRAWINGS

FIG. 6 shows TDM signals and data sets exchanged by clients and network end nodes along two opposite directions of a data transmission connection between.

DESCRIPTION OF EMBODIMENTS

Figure 1:
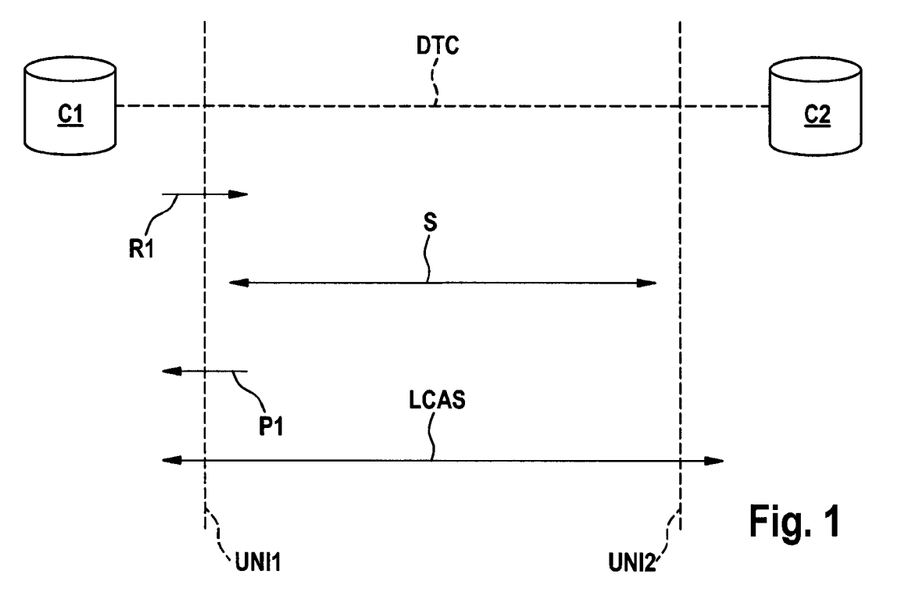
FIG. 1 shows steps of a protocol for adjusting a capacity using virtual concatenation.

FIG. 1 shows the steps carried out, according to the prior art, for adjusting a transmission capacity of a transmission connection in the case that the two clients are connected via a data transmission connection using virtual concatenation of virtual containers. The first client C1 is connected via a first user network interface UNI1 to the network N. Via a second user network interface UNI2, a second client C2 is also connected to the network N. The data transmission is carried out using the technique of time division multiplexing. The client C1 is provided with a number of virtual containers by the network N for data transmission along the data transmission connection DTC to the client C2. The network N may be a network of the type synchronous digital hierarchy (SDH) or an optical transport network (OTN).

In the case, that the client C1 wishes to increase the capacity of the data transmission connection DTC, it sends a request R1 to the network N for providing additional transmission capacity. In the step S, the network sets up additional capacity within the network by allocation a further virtual container for the data transmission connection DTC between the first user network interface UNI1 and the second user network interface UNI2. In the step P1, the network complies with the request of the client C1 by providing the additional virtual container to the first client C1.

In order to agree with the client C2 on how to use the further virtual container for data transmission at an increased capacity, the client C1 has to communicate with the client C2 via the protocol called Link Capacity Adjustment Scheme (LCAS).

Thus, the client C1 has to perform two different steps for increasing the transmission capacity between the client C1 and the client C2: the first step as the request R1 for the additional capacity in the form of an additional virtual container, and the second step in the form of signalling with the client C2 via the LCAS protocol for agreeing upon a modified data transmission via the virtual containers at a modified capacity.

First Embodiment

Proposed is a method for dynamically adjusting the transmission capacity of a data transmission connection and signalling the adjustment to a remote client. A data transmission connection starts at a first network end node and ends at a second network end node. A data transmission connection is provided by the network end nodes of a network to clients for data transmission between the clients.

Figure 2:
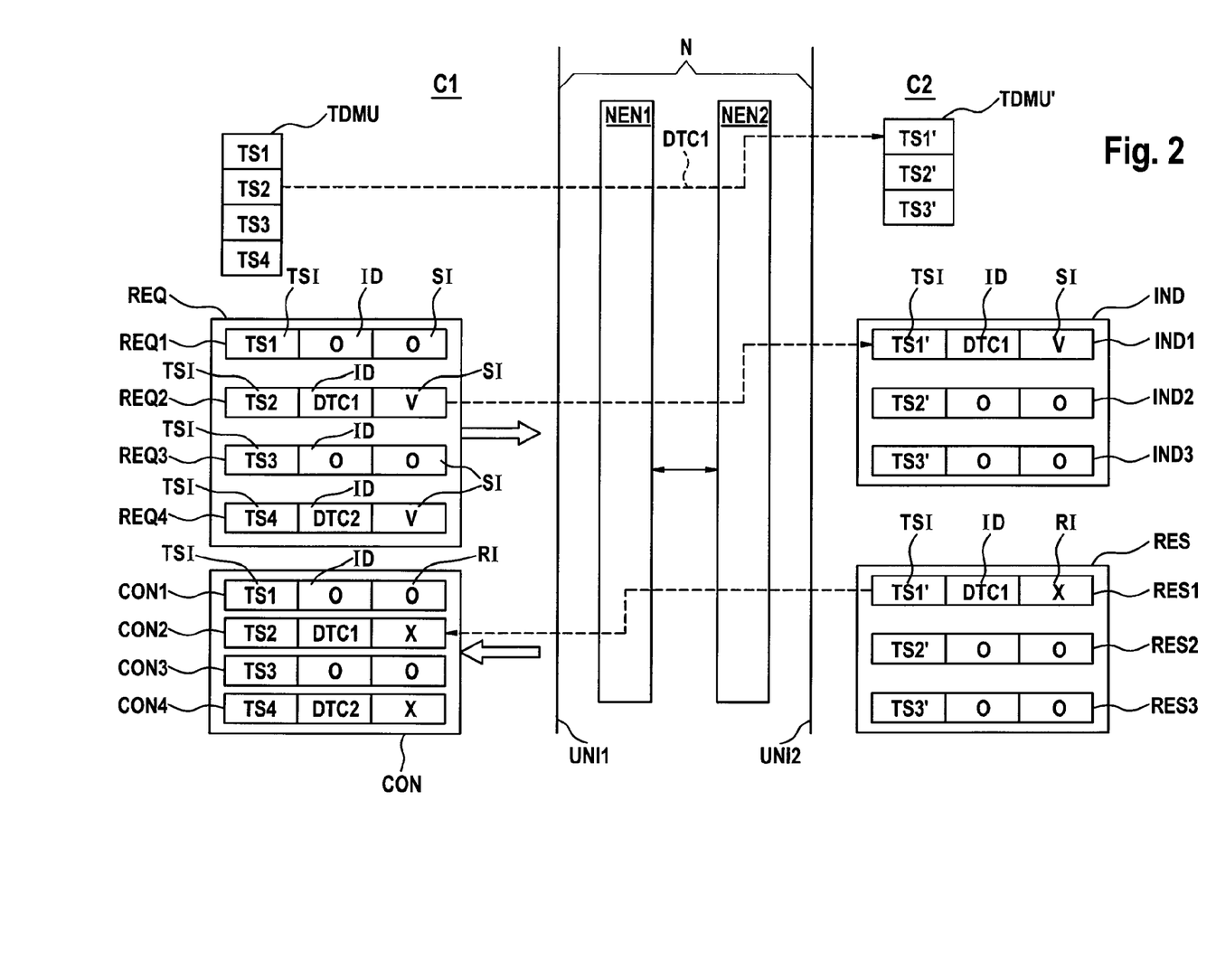
FIG. 2 shows TDM signals and data sets exchanged by clients and network end nodes.

FIG. 2 shows TDM signals and data sets exchanged by clients and network end nodes.

The first client C1 sends via a first user-network interface UNI1 an incoming frame-structured TDM signal TDMU containing incoming timeslots TS, in this example four incoming timeslots TS1, TS2, TS3, TS4, to a first network end node NEN1. An outgoing TDM signal TDMU' is sent by a second network end node NEN2 to a second client C2. In this example, the outgoing TDM signal TDMU' contains three timeslots TS', which are the timeslots TS1', TS2', TS3'.

For the purpose of signalling towards the network, which of the incoming timeslots TS shall be transmitted via which data transmission connection, the client C1 furthermore transmits to the network end node NEN1 a set of request data REQ. This set of request data contains for at least one incoming timeslot TS2 a corresponding subset REQ2 of request data REQ. Alternatively, the set of request data REQ contains for each incoming timeslot TS1, TS2, TS3, TS4 a corresponding subset REQ1, REQ2, REQ3, REQ4 of request data.

The subset REQ2 contains an identifier ID for identifying a data transmission connection DTC1 existing at the network end node NEN1, via which the data of the corresponding incoming timeslot TS2 shall be transmitted to a remote client C2. By providing the identifier ID for the corresponding timeslot TS2, it is uniquely defined, via which data transmission connection DTC1 and to which remote client C2 the data of the corresponding timeslot TS2 shall be transmitted. Preferably, a subset contains a timeslot identifier TSI for identifying that timeslot to which the subset corresponds.

Furthermore, the subset REQ2 of the request data REQ contains a status indicator SI for indicating to the network end node NEN1 a status requested by the client C1 for the corresponding incoming timeslot TS2. By using this status indicator SI, the client is able to signal towards the network end node NEN1, which status the corresponding timeslot TS2 shall have. Preferably, the status may be that the timeslot TS2 shall be included into the identified transmission connection DTC1 and carries valid data, that the timeslot shall not be included in any data transmission connection, that the timeslot TS2 shall be removed from the identified transmission connection DTC1, that the timeslot TS2 shall be added to the identified transmission connection DTC1 or that the timeslot TS2 carries maintenance data. The different statuses can be indicated by the status indicator taking respective values, as it will be explained in detail later on.

According to the example depicted in FIG. 2, the incoming timeslot TS2 shall be transported via the data transmission connection DTC1 to the second client C2. Thus, the subset of request data REQ2 corresponding to the timeslot TS2 contains an identifier ID of the value DTC1. The subsets REQ1 and REQ3 contain IDs of the value 0, indicating that the corresponding timeslots TS1, TS3 are currently not associated to any data transmission connection. The subset REQ4 contains an ID of the value DTC2, indicating that the data of the corresponding timeslot TS4 shall be transported via a further data transmission connection DCT2, which is not depicted in FIG. 2, to a further remote client, which is also not depicted in FIG. 2.

Since the client C1 requests a status of transmitting valid data transmission via the timeslots TS2 and TS4, the status indicators SI of the corresponding subsets REQ2, REQ4 are each of the value V, indicating a valid data transmission. Since the client C1 requests a status of no data transmission via the other timeslots TS1 and TS3, the corresponding subsets REQ1 and REQ3 contain status indicators SI of the value 0.

The network end node NEN1 receives the incoming TDM signal TDMU and the set of request data REQ. By checking the identifier of the received subsets of request data, the network end node NEN1 determines, which incoming timeslot is associated to a certain transmission connection. Furthermore, by checking the status indicator SI of a subset, the network end node NEN1 is able to determine a status requested by the client for the corresponding timeslot.

According to the example in FIG. 2, the timeslot TS2 is associated to the transmission connection DTC1 and carries valid data. The network end node NEN1 transmits the data of the timeslot TS2 to a far-end network end node NEN2 via the data transmission connection DCT1. The transmission of the subset REQ2 may be carried out via a control plane. Alternatively, the subset REQ2 may be transmitted as overhead information within data units exchanged between the network end nodes NEN1, NEN2.

The data of the timeslots TS2 and the corresponding subset REQ2 of request data REQ2 are received by the far-end network end node NEN2.

The far-end network end node NEN2 sends an outgoing frame-structured TDM signal TDMU' carrying outgoing timeslots TS' via the second user network interface UNI2 to the remote client C2. In the example shown in FIG. 2, the outgoing signal TDMU' comprises three timeslots TS1', TS2', TS3'.

The data which the far-end network end node NEN2 receives via the data transmission connection DTC1 is mapped by the far-end network end node NEN2 onto the outgoing timeslots TS'. At that time, when the data transmission connection DTC1 is established for the first time, the network end node NEN2 determines a mapping for the amount of data which is to be received and mapped onto outgoing timeslots TS', by checking the status indicators of the subsets of request data received via the data transmission connection DTC1. By this checking, the network end node NEN2 is able to determine the number of incoming timeslots TS whose data will be received via the data transmission connection DTC1, and thus is also able to determine the number of outgoing timeslots TS' which are needed for transmitting the received data to the remote client C2. The data capacity of one incoming time slot TS is equivalent to the data capacity of an outgoing time slot TS'.

If a mapping of received data is not possible, for instance due to an insufficient number of outgoing timeslots TS' being available for mapping received data onto them, the network end node NEN2 sends a rejection message to the network end node NEN1, which is then transmitted to the client C1. By this, the client C1 is informed, that the request for a certain transmission capacity could not be complied with by the network due to a problem occurring at the far-end network end node NEN2.

The network end node NEN2 transmits to the client C2 a set of indication data IND, which contains for at least one outgoing timeslot TS1' a corresponding subset IND1. Preferably, the indication data set IND contains for each outgoing timeslot TS1', TS2', TS3' a corresponding subset IND1, IND2, IND3. A subset IND1 comprises an identifier ID identifying an existing data transmission connection DTC1 and a status indicator SI for indicating a status of the corresponding timeslot TS1'.

The network end node NEN2 maps received subsets of request data REQ, corresponding to incoming timeslots TS, onto subsets of indication data IND, corresponding to outgoing timeslots TS1'.

According to the given example, the determined mapping defines a mapping of the data of the incoming timeslot TS2 received via the data transmission connection DTC1 onto the outgoing timeslot TS1'. The received request data subset REQ2 is mapped onto that indication data set IND1, which corresponds to the outgoing timeslot TS1' onto which the data of the incoming timeslot TS2 is mapped. By this, the request by the client C1 for an incoming timeslot TS2 corresponding to an outgoing timeslot TS1' is signalled to the remote client C2. The indication data set IND1 therefore carries an SI of the value V, which is the value of the SI copied from the request data subset REQ2.

The network end node NEN2 receives from the client C2 a set of response data RES, containing for at least one outgoing timeslot TS1' a corresponding subset RES1. Preferably, the response data set RES contains for each of the outgoing timeslots TS1', TS2', TS3' a subset of response data RES1, RES2, RES3. A response data subset contains an ID for identifying an existing data transmission connection DTC1 and a response indicator RI. The RI indicates a response by the client C2 to the status requested for the corresponding timeslot TS1'. In the given example, the client C2 gives a response of receiving valid data via the outgoing timeslot TS1' along the data transmission connection DCT1. This response is given by the subset of response data RES1 carrying the value DCT1 for the ID and the value X for the RI.

The network end node NEN2 transmits the received response data subset REQ2 to the network end node NEN1 for the purpose of signalling to the client C1 the response by the client C2.

The network end node NEN1 receives from the network end node NEN2 the transmitted response data subset REQ2.

The network end node NEN1 transmits to the client C1 a set of confirmation data CON, which contains for at least one incoming timeslot TS2 a corresponding subset CON2. Alternatively, the set of confirmation data CON contains for each of the incoming timeslots TS1, TS2, TS3, TS4 a subset of data CON1, CON2, CON3, CON4. A subset of confirmation data contains an ID for identifying an existing data transmission connection and an RI for indicating the response by the remote client C2 to the client C1. The network end node NEN1 maps the received subset of response data RES2 onto that subset of confirmation data CON2 which corresponds to the incoming timeslot TS2. Therefore, the subset CON2 carries a response indicator X due to the response RES1 being copied onto the subset of confirmation data CON2.

By mapping the response data subset RES1 onto the confirmation data subset CON2 and transmitting the confirmation data CON2 to the client C1, the client C1 is informed about the response by the remote client C2 to the status request by the client C1 for the corresponding timeslot TS2.

Figure 3:
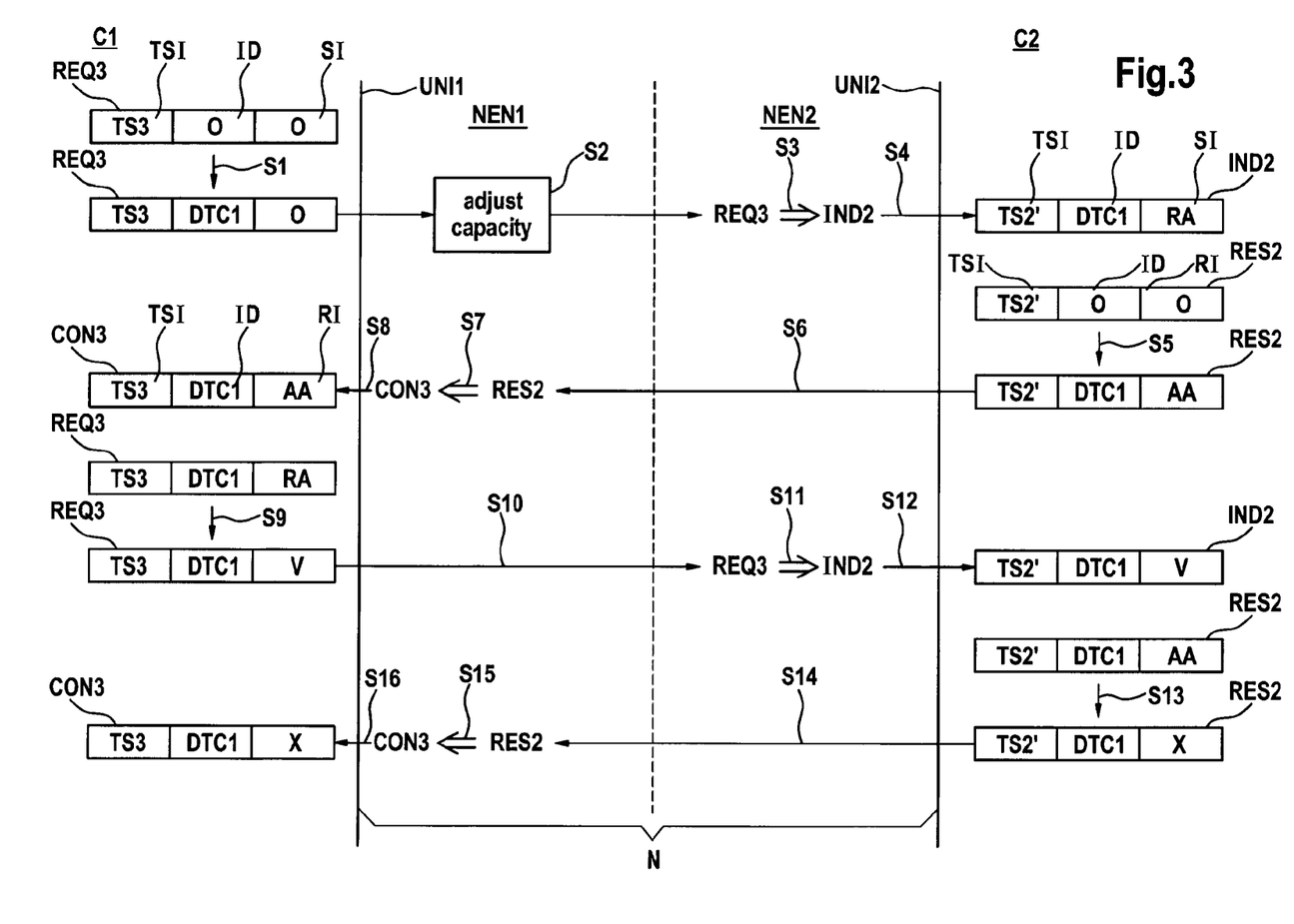
FIG. 3 shows different steps of a protocol for adding a timeslot to a data transmission connection.

FIG. 3 depicts different steps for increasing the capacity of the data transmission connection. Assumed is a current data transmission via the data transmission connection DTC1 as shown in FIG. 2. The client C1 wishes to add the timeslot TS3 to the data transmission connection DTC1.

In a first step S1, the client C1 changes the ID of the request data subset REQ3, which corresponds to the timeslot TS3 that shall be added. The ID is changed from the value 0, indicating no association of the timeslot TS3 to any data transmission connection, to the value DCT1, indicating an association of the timeslot TS3 to the data transmission connection DTC1.

The change of the ID alone is not yet a trigger for the network to increase the capacity of the data transmission connection DCT1. The client C1 furthermore changes the SI from the value 0 to the value RA (request addition), indicating a request to add the timeslot TS3 to the identified data transmission connection DCT1. The request data is transmitted by the client C1 to the network end node NEN1, where the value RA for the SI triggers an adjustment of the transmission capacity, as the step S2. The transmission capacity is adjusted by the network end node NEN1 in accordance with a capacity necessary for transmitting the data of those timeslots TS2, TS3, which are associated to the data transmission connection and for which the SI indicates either valid data or a request for an addition. The network end node NEN1 performs the adjustment by exchanging messages with the far-end network end node NEN2 and possibly further network nodes for agreeing upon a data transmission between the network end nodes NEN1, NEN2 at the adjusted transmission capacity.

Once the transmission capacity is adjusted, the subset REQ3 is transmitted by the network end node NEN1 to the far-end network end node NEN2, where it is received. Since the SI of the received request data set REQ3 indicates a request for adding the timeslot TS3 to the data transmission connection DTC1, the network end node NEN2 determines a new mapping for mapping data which will be received via the data transmission connection DTC1 onto outgoing timeslots TS1', TS2'. In this examples, the network end node chooses to map the received data of the incoming timeslot TS2 onto the outgoing timeslot TS1', as already determined earlier and depicted in FIG. 2, and to map the received data of the incoming timeslot TS3 onto the outgoing timeslot TS2'. Thus, the outgoing timeslot TS2' is added to the data transmission connection DTC1. Furthermore, the network end node NEN2 maps the received request data set REQ3 onto that indication data set IND2, which corresponds to the timeslot TS2' added to the data transmission connection DTC1. The determination of the mapping is depicted as the step S3. In the step S4, the indication data IND is transmitted to the client C2. Here, the subset IND2 of the indication data IND now contains the ID of the value DCT1 and the SI of the value RA, indicating the request to add the timeslot TS2' to the data transmission connection DCT1.

As the step S5, the client C2 changes within the subset of the response data RES2, which corresponds to the timeslot TS2 that shall be added, the ID from the value 0 to the value DCT1 and the response indicator RI from the value 0 to the value AA (accept addition). The value AA indicates, that the client C2 accepts an addition of the timeslot TS2' to the data transmission connection DCT1. As the step S6, the response data set RES2 is transmitted to the network end node NEN2 an from thereon transmitted to the network end node NEN1, for signalling to the client C1 the response by the client C2.

As the step S7, the network end node NEN1 maps the received subset RES2, which corresponds to the outgoing timeslot TS2', onto that subset CON3 of confirmation data CON, which corresponds to the incoming timeslot TS3 that shall be added. The network end node NEN1 then transmits the confirmation data subset CON3 to the client C1 for signalling to the client C1 the response by the client C2. This is carried out in the step S8.

The client C1 receives the confirmation data subset CON3. The client C1 can now derive from the RI of the subset CON3 having the value AA, that the client C2 accepts the request to add the timeslot TS3 to the data transmission connection DTC1. Thus, the client C1 can start to transmit valid data in the added timeslot TS3.

Furthermore, the client C1 signals that valid data is transmitted in the added timeslot TS3. Therefore, as the step S9, the client C1 changes the SI within the request data subset REQ3 from the value RA to the value V (valid data), indicating that valid data is transmitted via the corresponding timeslot TS3.

The client C1 transmits the request data subset REQ3 to the network end node NEN1. The network end node NEN1 derives from the value V for the SI of the request data subset REQ3 that valid data is transmitted in the corresponding incoming timeslot TS3. Thus, the network end node NEN1 transmits the data of the incoming timeslot TS3 to the network end node NEN2. The request data subset REQ3 is also transmitted to the network end node NEN2 for signalling to the client C2 the requested status of the corresponding timeslot TS3. This is carried out as the step S10.

The data of the timeslot TS2 is also transmitted to the network end node NEN2, and there mapped onto the outgoing timeslot TS1', as depicted in FIG. 2.

The network end node NEN2 receives the data and the request data subset REQ3. Since the value V for the SI indicates a transmission of valid data, the network end node NEN2 maps the data, which originated from the incoming timeslot TS3, onto the outgoing timeslot TS2', as determined previously. The data, which originated from the incoming timeslot TS2, is mapped onto the outgoing timeslot TS1', as depicted in FIG. 2. Furthermore, the request data subset REQ3 is mapped by the network end node NEN2 onto the indication data subset IND2, which corresponds to the outgoing timeslot TS2'. This is carried out as the step S11.

As the step S12, the indication data subset IND2 is transmitted to the client C2 for signalling to the client the requested status of the corresponding timeslot TS2'. The client C2 can now derive from the value V for the SI of the indication data subset IND2, that it should receive valid data via the timeslot TS2'.

If the client C2 detects a reception of valid data within the timeslot TS2', the client C2 changes the RI of the response data subset RES2 from the value AA to the value X, indicating a reception of valid data via the corresponding outgoing timeslot TS2'. This change is carried out as the step S13. As the step 14, the response data subset RES2 is transmitted to the network end node NEN2, and from thereon transmitted to the network end node NEN1 for signalling to the client C1 the response of the client C2 concerning the data transmission in the timeslot TS2'.

The network end node NEN1 receives the response data subset RES2 and maps it onto that confirmation data subset CON3, which corresponds to the added timeslot TS3. This is carried out in the step S15.

As the step S16, the confirmation data subset CON3 is transmitted by the network end node NEN1 to the client C1. The client C1 can derive from the value X for the RI of the confirmation data subset CON3, that the client C2 is confirming reception of valid data, which originated from the incoming timeslot TS3.

Figure 4:
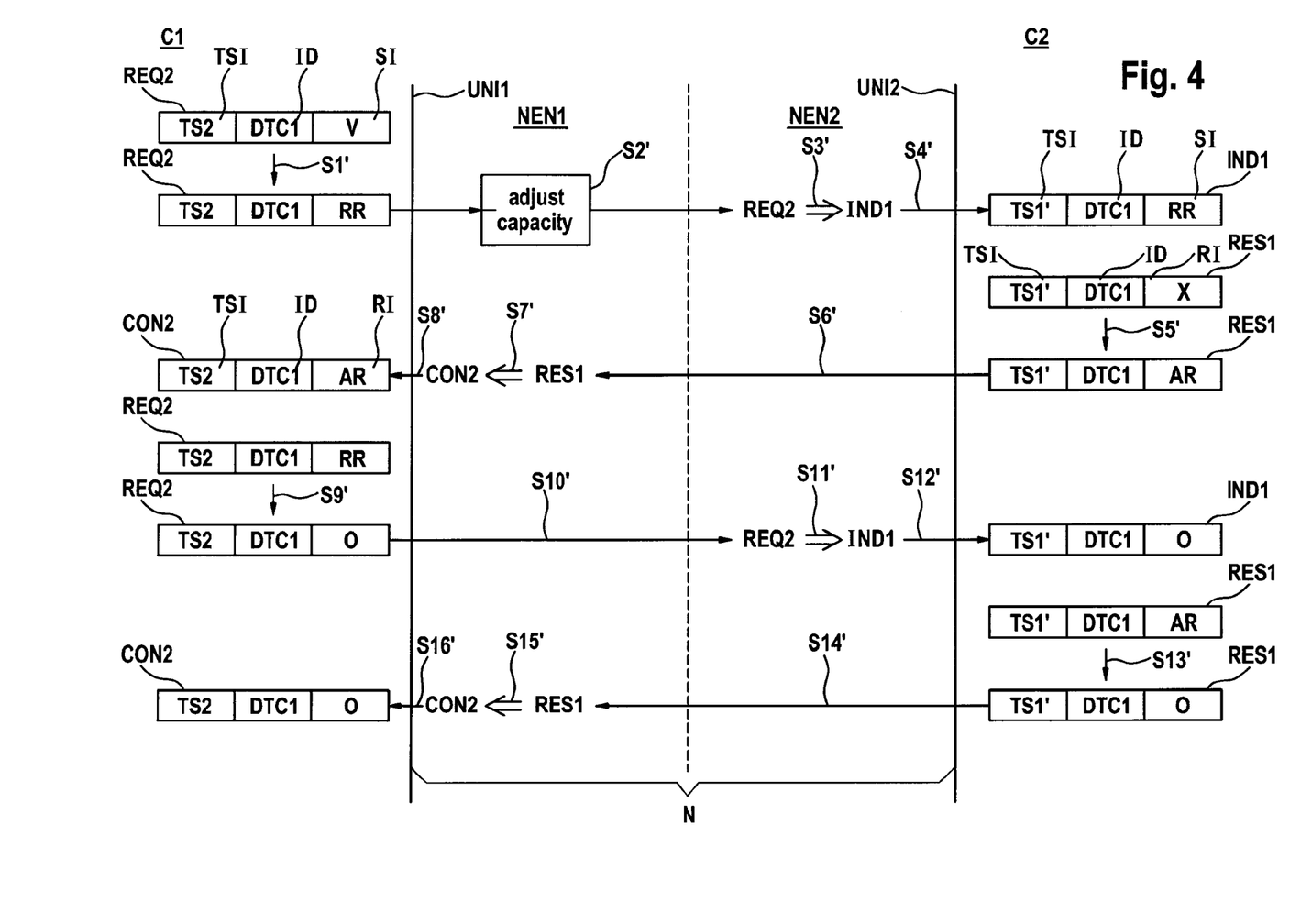
FIG. 4 shows different steps of a protocol for removing an timeslot from a data transmission connection

FIG. 4 depicts different steps of a protocol for decreasing a capacity of a data transmission connection. After adding the timeslot TS3 to the data transmission connection DTC1, the client C1 now wishes to remove the timeslot TS2 from the data transmission connection DTC1.

The client C1 changes the SI of the request data subset REQ2 from the value V to the value RR (request removal), indicating a request to remove the corresponding timeslot TS2 from the identified data transmission connection DCT1. The request data subset REQ2 is transmitted by the client C1 to the network end node NEN1, where the value RR for the SI triggers an adjustment of the transmission capacity, as the step S2'. The transmission capacity is adjusted by the network end node NEN1 in accordance with a capacity necessary for transmitting the data of those timeslots, which are associated to the data transmission connection and for which the SI indicates either valid data or a request for an addition. In this example, the timeslot TS3 shall remain in the data transmission connection DTC1, but the timeslot TS2 shall be removed from the data transmission connection DTC1. Therefore, the network end node NEN1 adjusts the data transmission capacity for transmitting the data of the timeslot TS3. The network end node performs the adjustment by exchanging messages with the far-end network end node NEN2 and possibly further network nodes for agreeing upon a data transmission between the network end nodes NEN1, NEN2 at the adjusted transmission capacity.

Once the transmission capacity is adjusted, the request data subset REQ2 is transmitted by the network end node NEN1 to the far-end network end node NEN2, where it is received. Since the SI of the received request data set REQ2 indicates a request for removing the timeslot TS2 from the data transmission connection DTC1, the network end node NEN2 determines a new mapping for mapping data which will be received via the data transmission connection DTC1 onto outgoing timeslots TS2'. In this examples, the network end node chooses to map the received data of data of the incoming timeslot TS3 onto the outgoing timeslot TS1', as already determined earlier and depicted in FIG. 3.

As the step S3', the network end node NEN2 maps the received request data set REQ2 onto that indication data set IND1, which corresponds to the timeslot TS1', which shall be removed from the data transmission connection DTC1. In the step S4', the indication data subset IND1 is transmitted to the client C2. Here, the subset IND1 of the indication data now contains the ID of the value DCT1 and the SI of the value RR, indicating the request to remove the timeslot TS1' from the data transmission connection DCT1.

In the case the client C2 accepts the removal of the timeslot TS1' from the data transmission connection DTC1, it sets the RI of the response data subset RES1, which corresponds to the timeslot TS1', to the value AR (accept removal), carried out as the step S5'. The value RA indicates, that the client C2 accepts a removal of the timeslot TS1' from the data transmission connection DCT1.

As the step S6', the response data set RES1 is transmitted to the network end node NEN2 and from thereon transmitted to the network end node NEN1, for signalling to the client C1 the response by the client C2.

As the step S7, the network end node NEN1 maps the received subset RES1, which corresponds to the outgoing timeslot TS1', onto that subset CON2 of confirmation data, which corresponds to the incoming timeslot TS2 that shall be removed. The network end node NEN1 then transmits the confirmation data subset CON2 to the client C1 for signalling to the client C1 the response by the client C2. This is carried out in the step S8'.

The client C1 receives the confirmation data subset CON2. The client C1 can now derive from the RI of the subset CON2 having the value RA, that the client C2 accepts the request to remove the timeslot TS2 from the data transmission connection DTC1.

Furthermore, the client C1 signals that no data is transmitted in the timeslot TS2. Therefore, as the step S9', the client C1 changes the SI within the request data subset REQ2 from the value RR to the value 0, indicating that no data is transmitted via the corresponding timeslot TS2.

The client C1 transmits the request data subset REQ2 to the network end node NEN1. The network end node NEN1 derives from the value 0 for the SI of the request data subset REQ2 that no data is transmitted in the corresponding incoming timeslot TS2. The network end node NEN1 transmits the request data subset REQ2 to the network end node NEN2 for signalling to the client C2 the requested status of the corresponding timeslot TS2. This is carried out as the step S10'.

The request data subset REQ2 is mapped by the network end node NEN2 onto the indication data subset IND1, which corresponds to the outgoing timeslot TS1'. This is carried out as the step S11'.

As the step S12', the indication data subset IND1 is transmitted to the client C2 for signalling to the client the requested status of the corresponding timeslot TS1'. The client C2 can now derive from the value 0 for the SI of the indication data subset IND2, that the timeslot TS1' shall not carry any data.

The client C2 changes the RI of the response data subset RES1 from the value AR to the value 0, indicating that the outgoing timeslot TS1' is not carrying data. This is carried out as the step S13'. As the step 14', the response data subset RES1 is transmitted to the network end node NEN2, and from thereon transmitted to the network end node NEN1 for signalling to the client C1 the response of the client C2 concerning the data transmission in the timeslot TS1'.

The network end node NEN1 receives the response data subset RES1 and maps it onto the confirmation data subset CON2, which corresponds to the timeslot TS2. This is carried out in the step S15'.

As the step S16', the confirmation data subset CON2 is transmitted by the network end node NEN1 to the client C1. The client C1 can derive from the value 0 for the RI of the confirmation data subset CON2, that the client C2 is confirming that no data is received from the incoming timeslot TS2.

Further steps of setting the ID in the request data subset REQ2 and in the response data subset RES1 from the value DTC1 to the value 0 are carried out by the client C1 and the client C2, respectively. The value 0 for the ID of a subset indicates, that a client assumes no association of the corresponding timeslot to any data transmission connection. Once, the ID of a subset carries the value 0 and the SI or the RI of that subset carries the value 0, this indicates, that the corresponding timeslot is set free and can be used by other data transmission connections.

Figure 5:
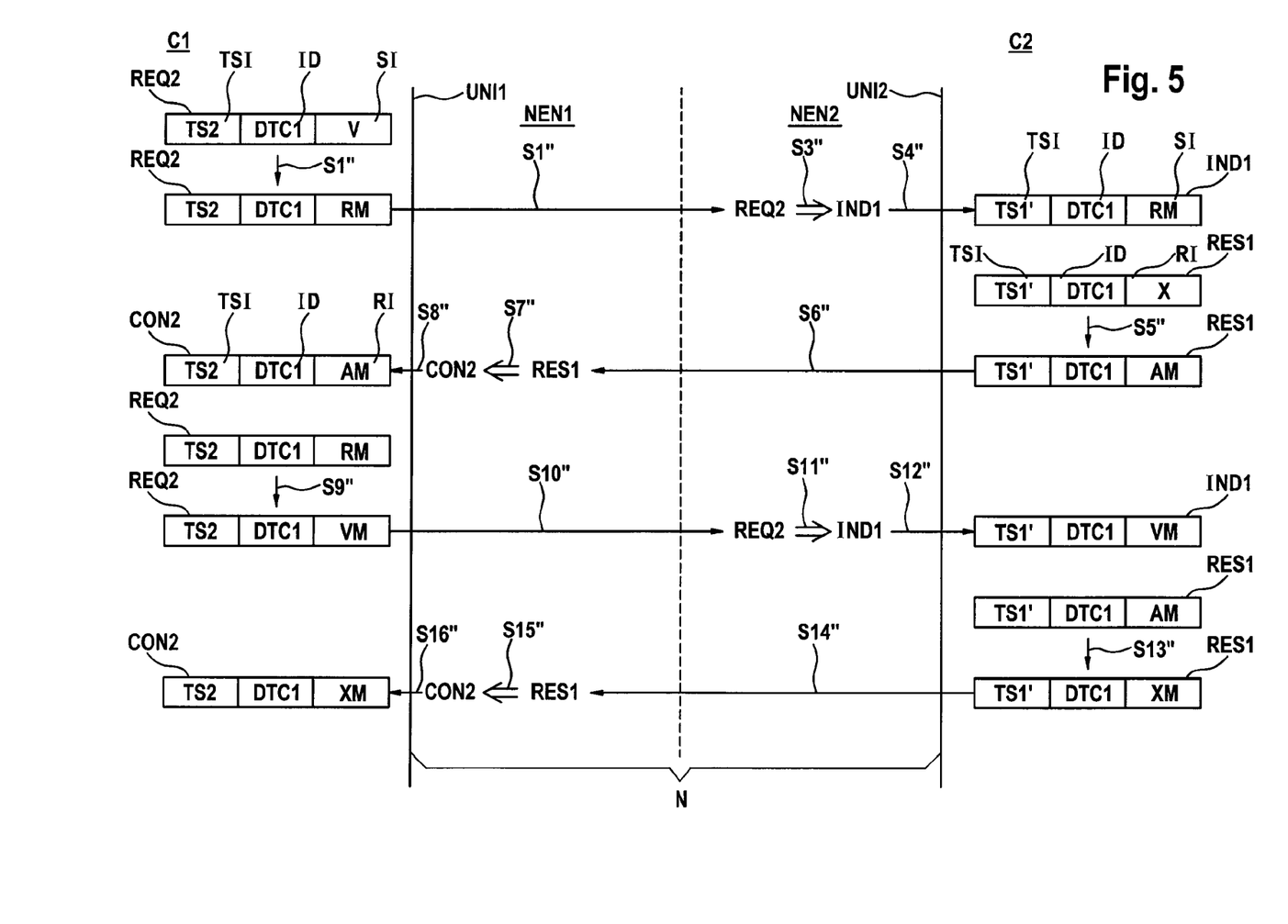
FIG. 5 shows different steps of a protocol for setting a timeslot into maintenance mode.

FIG. 5 depicts different steps of a protocol for setting a part of a capacity into a maintenance mode. This is desirable in the case, that the client C1 wishes to transmit via a certain incoming timeslot maintenance data instead of valid data. In the shown example, the client C1 wishes to set the outgoing timeslot TS2 into maintenance mode.

A data transmission as shown in FIG. 2 and described above is assumed.

In a first step S1", the client C1 changes the SI of the request data subset REQ2 from the value V to the value RM (request maintenance), indicating a request to transmit maintenance data in the timeslot TS2 via the identified data transmission connection DCT1. The request data subset REQ2 is transmitted by the client C1 to the network end node NEN1, where the value RM for the SI triggers the network end node NEN1 to ensure a transmission of maintenance data via the timeslot TS2. The network end node NEN1 ensures this, by negotiating with the far-end network end node NEN2 and possibly further network nodes via a message exchange on how to transmit the maintenance data. The transmission of the maintenance data from the network end node NEN1 to the network end node NEN2 may be carried out in the same data transport unit as for the transmission of valid data between the network end nodes NEN2, NEN1. As an alternative solution, the transmission of the maintenance data may be carried out in a separate data transport unit transmitted from the network end node NEN1 to the network end node NEN2.

Once the transmission of the maintenance data between the network end nodes NEN1, NEN2 is determined and thus ensured, the subset REQ2 is transmitted by the network end node NEN1 to the far-end network end node NEN2, where it is received. This is carried out as the step S2".

The SI of the received request data set REQ2 indicates a request for setting the timeslot TS2 into maintenance mode. The network end node NEN2 maps the received request data set REQ2 onto that indication data set IND1, which corresponds to the timeslot TS1'. The mapping of the data of the timeslot TS2 onto the timeslot TS1' was determined previously as described above and as shown in FIG. 2. In the step S4", the indication data subset IND1 is transmitted to the client C2. Here, the subset IND1 of the indication data now contains the SI of the value RM, indicating the request to transmit maintenance data via the timeslot TS1'.

As the step S5", the client C2 changes within the subset RES1 of the response data, which corresponds to the timeslot TS1', that shall transfer maintenance data, the response indicator RI from the value X to the value AM (accept maintenance). The value AM indicates, that the client C2 accepts to received maintenance data via the timeslot TS1'. As the step S6", the response data set RES1 is transmitted to the network end node NEN2 an from thereon transmitted to the network end node NEN1, for signalling to the client C1 the response by the client C2.

As the step S7", the network end node NEN1 maps the received subset RES1, which corresponds to the outgoing timeslot TS1', onto that subset CON2 of confirmation data, which corresponds to the incoming timeslot TS2 that shall be set into maintenance mode. The network end node NEN1 then transmits the confirmation data subset CON2 to the client C1 for signalling to the client C1 the response by the client C2. This is carried out in the step S8".

The client C1 receives the confirmation data subset CON2. The client C1 can now derive from the RI of the subset CON2 having the value AM, that the client C2 accepts the request for setting the timeslot TS2 into maintenance mode. Thus, the client C1 can start to transmit maintenance data in the timeslot TS2.

Furthermore, the client C1 signals that maintenance data is transmitted in the timeslot TS2. Therefore, as the step S9", the client C1 changes the SI within the request data subset REQ2 from the value RM to the value VM (valid maintenance data), indicating that valid maintenance data is transmitted via the corresponding timeslot TS2.

The client C1 transmits the request data subset REQ2 to the network end node NEN1. The network end node NEN1 derives from the value VM for the SI of the request data subset REQ2 that valid maintenance data is transmitted in the corresponding incoming timeslot TS2. Therefore, the network end node NEN1 transmits the maintenance data of the incoming timeslot TS2 to the network end node NEN2. The request data subset REQ2 is also transmitted to the network end node NEN2 for signalling to the client C2 the requested status of the corresponding timeslot TS2. This is carried out as the step S10".

The network end node NEN2 receives the maintenance data and the request data subset REQ2. Since the value VM for the SI indicates a transmission of valid maintenance data, the network end node NEN2 maps the maintenance data, which originated from the incoming timeslot TS2, onto the outgoing timeslot TS1', as determined previously. Furthermore, the request data subset REQ2 is mapped by the network end node NEN2 onto the indication data subset IND1, which corresponds to the outgoing timeslot TS1'. This is carried out as the step S11".

As the step S12", the indication data subset IND1 is transmitted to the client C2 for signalling to the client C2 the requested status of the corresponding timeslot TS1'. The client C2 can now derive from the value VM for the SI of the indication data subset IND1, that it should receive valid maintenance data via the timeslot TS1'.

If the client C2 detects a reception of valid maintenance data within the timeslot TS1', the client C2 changes the RI of the response data subset RES2 from the value AM to the value XM, indicating a reception of valid maintenance data via the corresponding outgoing timeslot TS1'. This change is carried out as the step S13". As the step 14", the response data subset RES1 is transmitted to the network end node NEN2, and from thereon transmitted to the network end node NEN1 for signalling to the client C1 the response of the client C2 concerning the data transmission in the timeslot TS1'.

The network end node NEN1 receives the response data subset RES1 and maps it onto the confirmation data subset CON2, which corresponds to the timeslot TS2. This is carried out in the step S15".

As the step S16", the confirmation data subset CON2 is transmitted by the network end node NEN1 to the client C1. The client C1 can derive from the value XM for the RI of the confirmation data subset CON2, that the client C2 is confirming reception of valid maintenance data, which originated from the incoming timeslot TS2.

There is not a specified maximum period of time for a timeout between two steps of the described methods: the network infrastructure between the clients may take from milliseconds to minutes to provide the requested transfer of subsets. Timeouts between steps are set at the user-network interface UNI as system wide parameters, due to a typology of the actual network infrastructure indicated by the network.

According to an alternative solution, the request data set REQ, the indication data set IND, the response data set RES and the confirmation data set CON contain for each incoming timeslot TS a corresponding subset. Instead of transmitting only a single subset, whole data sets are exchanged at the user network interfaces UNI1, UNI2. If a client C1 transmits a whole request set REQ to a network end node NEN1, this has the advantage, that the network end node NEN1 is informed by the set of data about all statuses requested by the client for all incoming timeslots TS. This is of further advantage, since the client C1 may simply store the statuses requested by it as a request data set stored in a memory unit, change a status of a timeslot if desired and trigger after such a change a transmission the whole request data set REQ. Thus, the client C1 can always look up the different requested statuses of the different timeslots by simply checking the request data set REQ in the memory. Furthermore, in the case that the network end node NEN1 wants to check the statuses currently requested by the client C1 for the incoming timeslots TS, the network end node NEN1 may simply poll this information from the client C1 by sending a polling message to the client, upon which the client C1 transmits the request data set REQ to the network end node NEN1.

If a far-end network end node NEN2 transmits a whole indication set IND to a remote client, this has the advantage, that the remote client C2 is informed about all statuses requested by other clients for the outgoing timeslots TS'. For this purpose, the far-end network end node NEN2 stores the data of the indication data subsets received from the different clients and thus stores a whole indication set IND. In the case, that the remote client C2 wishes to check the statuses currently requested by other clients for the outgoing timeslots TS', the remote client C2 may simply poll this information from the far-end network end node NEN2 by sending a polling message to the far-end network end node NEN2, upon which the far-end network end node NEN2 transmits the indication data set IND to the remote client C2. Respective advantages are given for a transmission of a whole set of response data RES or a whole set of a confirmation data set CON.

According to a further alternative solution, the transmission of the data of the incoming timeslots from the network end node NEN1 to the further network end node NEN2 is carried out via mapping the data onto virtual containers sent from the network end node NEN1 to the network end node NEN2. The data is then extracted from the virtual containers by the further network end node NEN2. The determination of a necessary capacity by the network end node NEN1 leads to an adjustment of the capacity of the data transmission connection DTC1 in such a way, that the network end node NEN1 requests from the network N an additional virtual container for the identified data transmission connection DCT, or the network end node NEN1 requests from the network N to remove a virtual container from the identified data transmission connection DTC1. Virtual containers may be merged via virtual concatenation for providing a capacity. Furthermore, the network end node NEN1 communicates with the network end node NEN2 via the LCAS protocol in order to agree upon a hitless change of the capacity of the data transmission connection DTC1.

The advantage of this solution compared to the prior art is, that the client C1 does not have to carry out itself the step of changing a number of virtual containers and the step of signalling via the LCAS protocol for agreeing upon a hitless change of the capacity of the data transmission connection DCT1. These steps are carried out within the network N. The client simply has to provide the request data set REQ. Via a change of data within this request data set REQ, the client is now able to carry out two things at once: a change of a capacity for a data transmission connection DCT1 and signalling with the second client C2 via this request data set REQ as well as the further data sets IND, RES, CON. Thus, the proposed method provides a flexible method of signalling for a client for the purpose of changing a transmission capacity.

According to a further alternative solution, the network N is an optical transport network OTN and the user network interfaces are interfaces to an optical network as defined by the standard ITU-T G.709/Y.1331 (March 2003).

The transmission of the data of the incoming TDM timeslots from the network end node NEN1 to the network end node NEN2 is carried out via mapping the data onto optical data units ODU sent from the network end node NEN1 to the network end node NEN2. The data is then extracted from the optical data units by the network end node NEN2.

Optical data units may be combined via virtual concatenation for a combined data transmission as described in the standard ITU-T G.709/Y.1331 (March 2003). The determination of a necessary capacity by the network end node NEN1 leads to an adjustment of the capacity of the data transmission connection DCT1 in such a way, that the network end node NEN1 uses an additional optical data ODU unit via virtual concatenation for the identified data transmission connection DCT, or the network end node NEN1 removes an optical data unit of a virtual concatenated group of optical data units ODU for the identified data transmission connection DCT. Furthermore, the network end node NEN1 communicates with the further network end node NEN2 via protocols defined by the standard ITU-T G.709/Y.1331 (March 2003) in order to agree upon a hitless change of the capacity of the data transmission connection DCT1.

According to a further alternative solution, concerning an optical transport network, optical data units may have a variable capacity, depending on the bandwidth of the service to be carried as described in the draft revised standard ITU-T G.709/Y.1331. In this case the transport container is referred to be a flexible Optical Data Unit. The determination of a necessary capacity by the network end node NEN1 leads to an adjustment of the number of multiplex units over which the flexible Optical Data unit is mapped. As a consequence the capacity of the data transmission connection DCT1 should be adjusted in such a way, that the network end node NEN1 uses additional multiplex units to map the flexible Optical Data Unit with increased capacity over the identified data transmission connection DCT1, or the network end node NEN1 removes multiplex units to map the flexible Optical Data Unit with decreased capacity over the identified data transmission connection DCT1. Furthermore, the network end node NEN1 communicates with the network end node NEN2 via adequate protocols, in order to agree upon a hitless change of the bandwidth of the data transmission connection DCT1.

The explanations made above have been made for one direction of the described data transmission connection DTC1 leading from the client C1 to the client C2. Alternatively, a data transmission connection may comprise data transmission in two directions.

Figure 6:
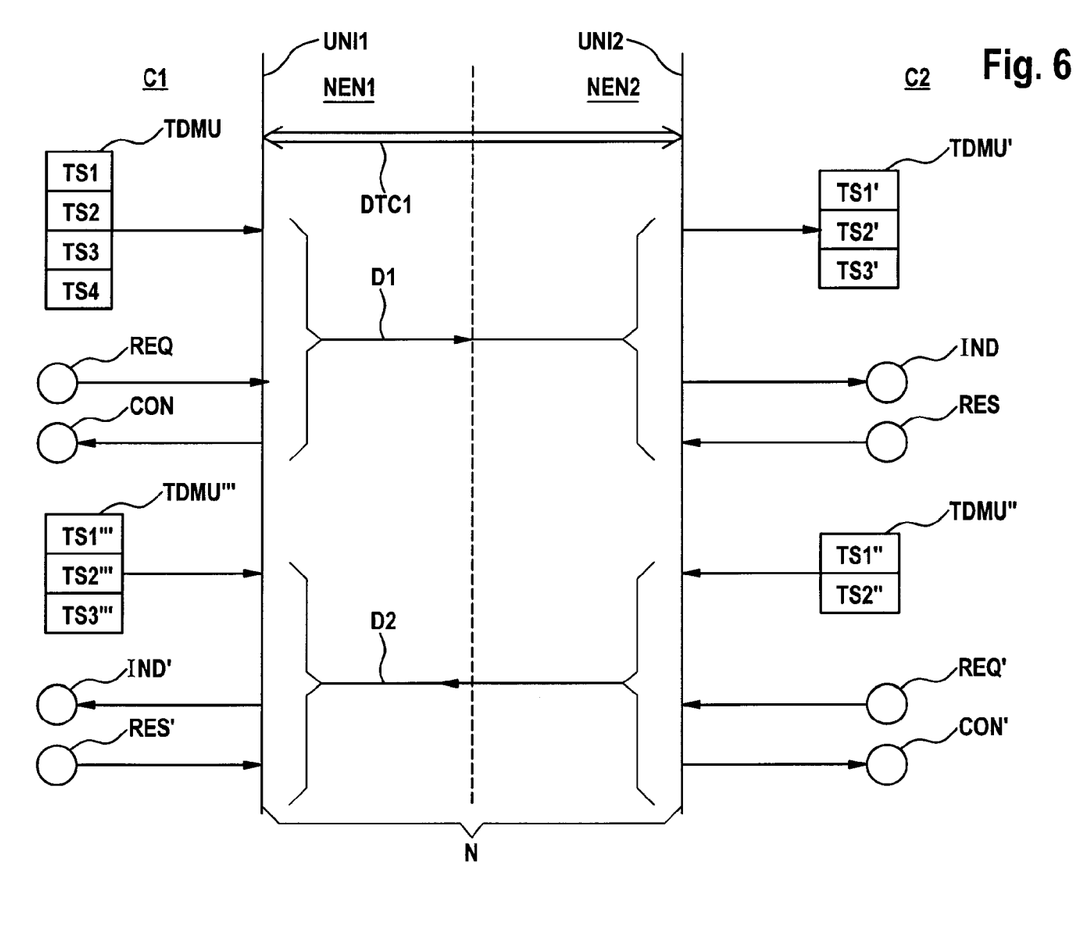

As shown in FIG. 6, one data transmission connection DCT1 between two clients C1, C2 comprises two directions: A first direction D1 as described above and a second direction D2 going in the opposite direction, leading from the second client C2 to the first client C1. Both directions D1, D2 of the data transmission connection DTC1 between two clients C1, C2 are uniquely identified by a value of a data transmission identifier ID, in this case the value DTC1.

For the data transmission along the second direction D2, a second incoming TDM signal TDMU" consisting of timeslots TS" is sent by the client C2 to the network end node NEN2, and a second outgoing TDM signal TDMU'" consisting of timeslot TS'" is sent by the network end node NEN1 to the client C1.

The number of timeslots exchanged in one direction D1 of the data transmission connection does not have to be the same as the number of timeslots exchanged in the opposite direction D2. The capacity of a data transmission connection can be asymmetric. According to the example in FIG. 6, the number of timeslots transmitted from the client C1 to the client C2 may range from zero to three, taking into account that in this example the maximum number of timeslots that can be received by the client C2 is three timeslots. The number of timeslots transmitted from the client C2 to the client C1 may range from zero to two timeslots, taking into account that in this example the maximum number of timeslots that can be transmitted by the client C2 is two timeslots.

Even furthermore, the principle of using the mentioned sets of data at the different user network interfaces UNI1, UNI2 can not only be used for a data transmission from the client C1 to a the client C2, but also for a data transmission from the client C2 to the client C1, without binding the number of timeslots used for data transmission in the different directions to each other. The number of timeslots used for data transmission in one direction may be different to the number of timeslots in the other direction.

Just as for the timeslots TS of the first direction D1 at the user network interface UNI1, there are two sets of data exchanged for the second direction D2 at each user network interface UNI2 for the timeslots TS". At the user network interface UNI2, the client C2 sends a set of request data REQ' to the network end node NEN2 and receives a set of confirmation data CON' from the network end node NEN2. At the user network interface UNI1, a set of indication data IND' is received by the client C1 from the network end node NEN1, and a set of response data RES' is sent by the client C1 to the network end node NEN1. The mentioned sets of data REQ', IND', RES', CON' have a relationship to each other as described for the sets of data REQ, IND, RES, CON for the first direction D1.

The proposed methods of adding a timeslot to a data transmission connection DTC, removing a timeslot from a data transmission connection or setting a timeslot into maintenance mode can be applied for either direction D1, D2 of the data transmission connection separately. This is ensured by the described methods of signalling. An adjustment of a capacity can be made in granularity of a single timeslot for one direction independently of the capacity of the data transmission via the other direction.

The proposed methods are a powerful and flexible tool for a first client to adjust the capacity of a data transmission to a second client in one direction of a given data transmission connection in a very convenient way, independently from a data transmission along the other direction of the same data transmission connection, and also independently from a further, third data transmission connection for data exchange with a third client.

Taken the above explanations into consideration, one can see, that using a request data set REQ and a confirmation data set CON at the first user network interface UNI1 and an indication dataset IND and a response data set RES at the second user network interface UNI2 in the above described way gives clear advantages compared to the prior art.

A first advantage is, that a client may demand a change of a capacity of a data transmission connection, by simply changing the status indicator of a request subset of the corresponding timeslot, which shall be transmitted additionally to timeslots already being included in the data transmission connection. Since the network end node checks the status identifier of the received incoming timeslots, and interprets the changed status identifier as a trigger for adjusting the capacity of the data transmission connection, a change of a status identifier by the client automatically causes a dynamic adjustment of the transmission capacity by the network.

Furthermore, since the request data subset sent by the client to the network end node is mapped by the far-end network end node onto the corresponding indication data subset which then is transmitted to the remote client, the status indicator of a request data subset is a solution for signalling from the client to the remote client that the remote client shall prepare to receive data via the corresponding outgoing timeslot, onto which the data of the corresponding incoming timeslot will be mapped.

Thus, a method is provided, by which a client simply needs to change one subset of data, in order to have the capacity of a data transmission connection adjusted by the network, and in order to send a signal for negotiating with a remote client about adjusting a capacity of a data transmission connection.

Furthermore, by setting a status indicator to a certain value within a response data subset for a certain outgoing timeslot, the remote client is able to signal via the mapping of the response data subset onto a confirmation data subset to the client, that it is ready to receive valid data through that additional timeslot, for which the client changed the status indicator.

In contrast to the prior art, it is not necessary anymore to perform different steps of different protocols for achieving the same result. In the prior art, a first step is needed for requesting additional capacity via a second virtual container, and further steps are needed for signalling between two clients via the LCAS protocol.

The proposed method of signalling provides two things at the same time to the client: enabling the client to demand from a network an adjusted capacity, and also having this request signalled via the network to the remote client as a method of signalling for negotiating about the data transmission at an adjusted transmission capacity.

Furthermore, the proposed method is a great advantage, since the concept of using a set of request data, indication data, response data and confirmation data at user network interfaces can be used for controlling data transmission from one client to further different clients, as long as the described method with the corresponding data sets is provided by the network at each user network interface of each client.

Thus, the proposed method not only enables a first client to control the capacity of a data transmission to a second client via one data transmission connection, but also enables the first client to shift capacity from this one data transmission connection to a further data transmission connection, leading to a third client. By this, the first client has a method at hand, for flexibly adjusting the transmission capacities of different transmission connections, while using a flexible method of demanding a capacity change from the network and at the same time signalling this change to the other clients.

The first client can furthermore check, whether the request was complied with by the remote client, by simply checking the subset of the confirmation data subset corresponding to the incoming timeslot for which the first client changed the requested status. This is possible, since the response data subset created by the remote client is mapped onto the confirmation data subset, which corresponds to the timeslot, by the network In the case, that two clients C1, C2 involved in a data transmission are routers, it is important for the first router C1 to know that the second router C2 is able to receive data at an adjusted transmission capacity. Therefore, the proposed method provides a powerful tool to the routers C1, C2 for demanding an adjusted capacity for a certain data transmission connection and at the same time for signalling between the routers C1, C2 for ensuring, that the modification of the transmission capacity is performed in a hitless manner, meaning that no data traffic is lost during a modification of the transmission capacity.

Figure 7:
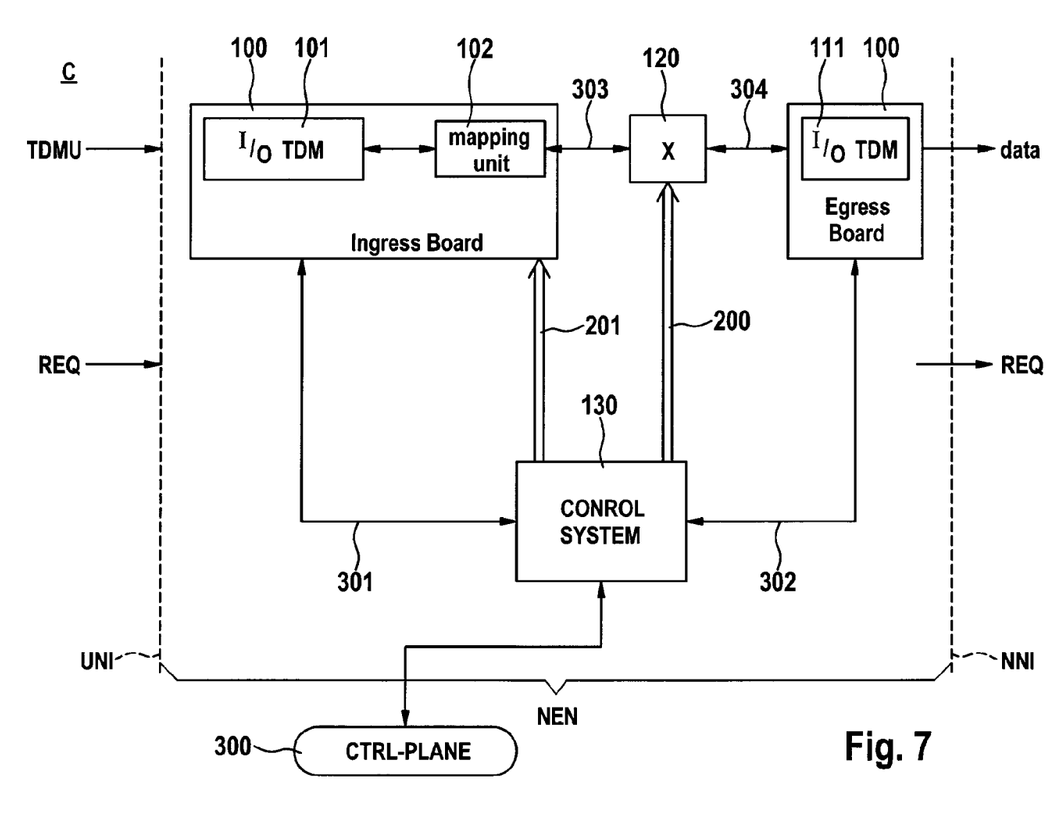
FIG. 7 show a network endpoint node.

Proposed is furthermore a network endpoint node NEN for a transport network as depicted in FIG. 7. The network endpoint node NEN contains in ingress board 100 with at least one TDM interface, which is adapted to receive from a client C a frame-structured TDM signal TDMU carrying timeslots via a user network interface UNI. Furthermore, the ingress board 100 comprises a mapping unit 102 for mapping data of received timeslots TS onto data transport unit which are used for data transmission from the network endpoint node NEN to a far-end network endpoint node. The mapped data is exchanged from the mapping unit via a data interface 303 to a switching matrix 120 of the network endpoint node NEN. The switching 120 matrix switches data transport units between the ingress board and at least one egress board 110. For this purpose, the switching matrix 120 exchanges data via data transport units with the egress board 110 via a further data interface 304. The egress board 110 comprises at least one TDM interface 111 for sending data transport units via a network-network interface NNI along a data transmission connection to a far-end network endpoint node.

The network endpoint node NEN comprises a control system 130, which is adapted to receive from the client C a request data set REQ, comprising for at least one timeslot a corresponding subset. The request data set REQ may be received from the client C by the control system 130 via a control plane 300. Alternatively, the request data set REQ may be received within the TDM signal TDMU as overhead information, which then is extracted by an overhead unit, not depicted in FIG. 7, located on the ingress board. In this case, the control system 130 is connected with the ingress board via a communication interface 301.

The control system 130 may be implemented on a single controller board or alternatively on multiple controller boards connected via interfaces.

The request data subset contains an identifier, which identifies an existing data transmission connection, and a status indicator, which indicates a status the corresponding incoming timeslot requested by the client C.

If the status indicator of the received request data subset indicates a request for adding the at least one timeslot to or removing the at least one timeslot from the identified data transmission connection, then the control system 130 adjusts the transmission capacity of that data transmission connection. The control system 130 does so, by exchanging messages with the far-end network end node and possibly further network nodes for agreeing with these nodes upon an adjusted transmission capacity. This message exchange may be carried out via a control plane 300.

If the status indicator of the received request data subset indicates valid data in the corresponding timeslot, then the control system 130 configures the network endpoint node NEN for a transmission of the data of the timeslot via the identified data transmission connection. This configuration is carried out by the control system 130 by configuring the switching matrix 120 via a control interface 200 and the mapping unit 102 via a further control interface 201.

The control system 130 transmits the received request data subset to a far-end network endpoint node for signalling to a remote client the requested status of the corresponding timeslot. This transmission may be carried out via a control plane 300. Alternatively, this transmission is carried out by inserting the request data subset as overhead information into a data transport unit sent by the TDM interface 111 to a far-end network endpoint node. For this purpose, the control system 130 exchanges data via a communication interface 302 with the egress board 110.

The network endpoint node is furthermore adapted to carry out the steps of the methods proposed above.

Figure 8:
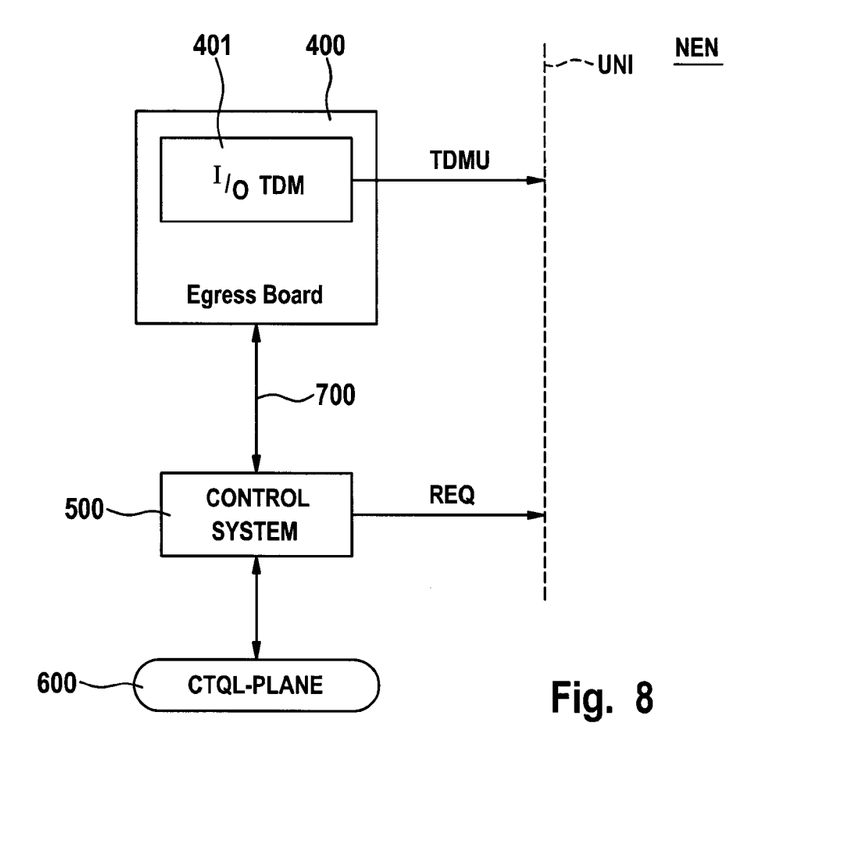
FIG. 8 shows a client device.

Proposed is furthermore a client device C as shown in FIG. 8, which comprises an egress board with at least one TDM interface 400, which is adapted to send to a network endpoint node NEN a frame-structured TDM signal carrying timeslots via a user-network interface UNI. Furthermore, the client device comprises a control system 500, which is adapted to transmit to the network endpoint node NEN a request data set REQ, which comprises for at least one of the timeslots a corresponding subset. The transmission of the request data set REQ may be carried out by the control system 500 via a control plane 600. Alternatively, the request data set REQ may be transmitted as overhead information of the TDM signal TDMU. For this purpose, the request data set REQ is sent by the control system 500 via a data interface 700 to an overhead unit, which is not depicted in FIG. 8, located on the egress board. The overhead unit inserts the request data set REQ as overhead information into the TDM signal TDMU.

The request data subset contains an identifier for identifying an existing data transmission connection existing at the network endpoint node and a status indicator for indicating to the network endpoint node a requested status for the corresponding timeslot.

The control system 500 requests of the network endpoint node NEN an addition of the at least one timeslot to the identified data transmission connection or a removal of the at least one timeslot from the identified data transmission connection by setting the status indicator to a respective value indicating the request for addition or removal.

Furthermore, the control system 500 requests of the network endpoint node NEN a transmission of data carried in the at least one timeslot, by setting the status indicator to a respective value indicating valid data in the timeslot.

The invention claimed is:

1. A method of dynamically adjusting the transmission capacity of a data transmission connection, comprising the steps of:
at a network end node,
receiving from a client via a first user network interface
an incoming frame-structured time division multiplex signal carrying incoming timeslots, and
a request data set, comprising for at least one incoming timeslot a corresponding subset, said request data subset having
an identifier identifying an existing data transmission connection; and
a status indicator indicating a status requested by said client for the corresponding incoming timeslot;
if said status indicator indicates a request for adding said incoming timeslot to or removing said incoming timeslot from said data transmission connection, adjusting the transmission capacity of said data transmission connection,
otherwise, if said status indicator indicates valid data in said incoming timeslot, transmitting the data of said incoming timeslot via said existing data transmission connection to a far-end network end node, and
transmitting said request data subset to said far-end network end node for signalling said requested status to a remote client which is connected to said far-end network end node via a second user network interface.

2. The method according to claim 1,
wherein said network end node
receives from said far-end network end node a subset of response data having
an identifier identifying said existing data transmission connection, and
a response indicator indicating a response by said remote client to said requested status,
maps said subset of response data onto a subset of confirmation data, which corresponds to said incoming timeslot, and
transmits to said client via said first user network interface said subset of confirmation data for signalling said response to said client.

3. The method according to claim 1
wherein said far-end network end node
sends to said remote client via said second user-network interface an outgoing frame-structured time division multiplex signal carrying outgoing timeslots, and
determines a mapping for data received via said existing data transmission connection onto at least one of said outgoing timeslots;
if said status indicator of said request data subset received from said network end node indicates valid data being transmitted, transmits said data to said remote client in said at least one outgoing timeslot;
otherwise, if said status indicator of said received request data subset indicates a request for adding an incoming timeslot to or removing an incoming timeslot from said data transmission connection,
determines a new mapping for data received via said existing data transmission connection including adding an outgoing timeslot to or removing an outgoing timeslot from said data transmission connection, respectively;
maps said received request data subset onto an indication data subset corresponding to said added or removed outgoing time slot,
transmits to said remote client via said second user-network interface said indication data set for signalling to said remote client said request for adding said outgoing timeslot to or removing said outgoing timeslot from said data transmission connection, respectively.

4. The method according to claim 2,
wherein said far-end network end node
receives from said remote client via said second user-network interface said response data subset corresponding to said outgoing timeslot to be added or to be removed from said data transmission, respectively, and
transmits said response data subset to said network end node for signalling to said client said response.

5. A network endpoint node for a transport network, comprising:
a time-division-multiplex interface adapted to receive, via a user-network interface from a client, a frame-structured time-division-multiplex signal carrying timeslots,
a control system, adapted to
receive via said user-network interface from said client a request data set, comprising for at least one timeslot a corresponding subset, said request data subset having
an identifier identifying an existing data transmission connection and a status indicator indicating a status requested by said client for the corresponding timeslot;

adjust the transmission capacity of said data transmission connection if said status indicator indicates a request for adding said timeslot to or removing said timeslot from said data transmission connection, said adjustment being carried out by said controller exchanging messages with further network devices, configure said network endpoint node for a transmission of the data of said timeslot via said data transmission connection to a far-end network end node, if said status indicator indicates valid data in said timeslot, transmit said request data subset to said far-end-network end node for signalling said requested status to a remote client which is connected to said far-end network end node via a second user network interface.

6. A client device, comprising:

a time-division-multiplex interface, adapted to send via a user-network interface to a network endpoint node a frame-structured time-division-multiplex signal carrying timeslots, a control system, adapted to transmit via said user-network interface to said network endpoint node a request data set, comprising for at least one of said timeslots a corresponding subset, said request data subset having an identifier identifying a data transmission connection existing at said network endpoint node a status indicator indicating a status requested by said client corresponding timeslot;

request of said network endpoint node an addition of said timeslot to or a removal of said timeslot from said data transmission connection, by setting said status indicator to a respective value indication said request for addition or removal, request of said network endpoint node a transmission of data carried in said timeslot via said data transmission connection by setting said status indicator to a respective value indicating valid data in said timeslot.

* * * * *